US009857786B2

(12) United States Patent
Cristiano

(10) Patent No.: US 9,857,786 B2
(45) Date of Patent: Jan. 2, 2018

(54) SYSTEM AND METHOD FOR ALIGNING A COORDINATED MOVEMENT MACHINE REFERENCE FRAME WITH A MEASUREMENT SYSTEM REFERENCE FRAME

(71) Applicant: Recognition Robotics, Inc., Elyria, OH (US)

(72) Inventor: Stefano Cristiano, Milan (IT)

(73) Assignee: Recognition Robotics, Inc., Elyria, OH (US)

( * ) Notice: Subject to any disclaimer, the term of this patent is extended or adjusted under 35 U.S.C. 154(b) by 312 days.

(21) Appl. No.: 14/674,154

(22) Filed: Mar. 31, 2015

(65) Prior Publication Data

US 2016/0291571 A1 Oct. 6, 2016

(51) Int. Cl.
| | |
|---|---|
| G06F 19/00 | (2011.01) |
| G05B 19/04 | (2006.01) |
| G05B 19/402 | (2006.01) |
| G05B 15/02 | (2006.01) |
| B25J 9/16 | (2006.01) |
| G01B 21/04 | (2006.01) |

(52) U.S. Cl.
CPC .......... *G05B 19/402* (2013.01); *B25J 9/1692* (2013.01); *B25J 9/1697* (2013.01); *G01B 21/042* (2013.01); *G05B 15/02* (2013.01); *G05B 2219/37555* (2013.01); *G05B 2219/41366* (2013.01)

(58) Field of Classification Search
CPC ........................................................ G03F 9/00
USPC .......................................................... 700/192
See application file for complete search history.

(56) References Cited

U.S. PATENT DOCUMENTS

| | | | | |
|---|---|---|---|---|
| 4,831,549 | A  * | 5/1989 | Red ........................ | B25J 9/1692 |
| | | | | 700/254 |
| 5,297,238 | A  * | 3/1994 | Wang ..................... | B25J 9/1692 |
| | | | | 700/254 |
| 6,618,633 | B1 | 9/2003 | Gooch | |
| 8,095,237 | B2 * | 1/2012 | Habibi .................. | B25J 9/1692 |
| | | | | 29/702 |
| 8,559,699 | B2 * | 10/2013 | Boca ..................... | B25J 9/1679 |
| | | | | 382/153 |
| 8,744,215 | B2 * | 6/2014 | Handelman ............. | B25J 5/005 |
| | | | | 382/153 |
| 9,026,234 | B2 * | 5/2015 | Suzuki .................. | B25J 9/1669 |
| | | | | 700/1 |
| 9,138,895 | B2 * | 9/2015 | Melikian ............... | B25J 9/1664 |
| 9,156,162 | B2 * | 10/2015 | Suzuki ..................... | B25J 9/16 |
| 9,616,569 | B2 * | 4/2017 | Uhlenbrock .......... | B25J 9/1653 |
| 2011/0280472 | A1 | 11/2011 | Wallack | |
| 2015/0025683 | A1 | 1/2015 | Amano | |

(Continued)

OTHER PUBLICATIONS

European Search Report dated Sep. 30, 2016.

*Primary Examiner* — Suresh Suryawanshi

(74) *Attorney, Agent, or Firm* — Rankin, Hill & Clark LLP

(57) ABSTRACT

A method for aligning a machine tool reference frame with a camera reference frame includes applying at least two linear machine movements and at least two rotational movements to a machine arm. Measurements are taken during these movements. Transforming the camera reference frame to the machine reference frame is based on an angular offset and x, y and z offsets between a machine tool origin and a camera origin based on the measurements taken during the machine movements.

9 Claims, 2 Drawing Sheets

(56) References Cited

U.S. PATENT DOCUMENTS

2016/0151915 A1* 6/2016 Nishi .................... B25J 9/1692
  700/247
2016/0214255 A1* 7/2016 Uhlenbrock ........... B25J 9/1653

* cited by examiner

SYSTEM AND METHOD FOR ALIGNING A COORDINATED MOVEMENT MACHINE REFERENCE FRAME WITH A MEASUREMENT SYSTEM REFERENCE FRAME

BACKGROUND

Coordinated movement machines, such as industrial robots, are used to position and support a tool, e.g., a welder, a grasper, a paint gun or a drill bit, for operation on work pieces. Conventional robots have limitations on the accuracy to position a tool with respect to the work piece.

In one known system for positioning a robot tool, many sensors are required to be mounted in different locations around the area in which the robot is working. Other robot positioning systems use lasers or other structured light to determine the position of the robot tool with respect to the work piece. Other robot positioning systems align the robot tool through the use of a two-dimensional checkerboard where external measurements are required to be taken. Each of the aforementioned systems can take a long time to calibrate the robot so that the position of the tool on the robot with respect to a work piece is known. Many of the aforementioned systems require a highly skilled robot operator to calibrate the robot for working on the particular work piece of interest.

SUMMARY

In view of the foregoing, a method for aligning a coordinated movement machine tool reference frame with a measurement system reference frame is provided. The method includes applying at least two linear machine movements to a machine tool on a coordinated movement machine. Each linear machine movement is from a machine tool zero position on an initial coordinated movement machine reference frame and the at least two linear machine movements are not collinear with one another. The method further includes measuring at least two linear camera movements of a camera mounted on the coordinated movement machine for movement with the machine tool using the camera and a processor in communication with the camera. Each measurement is of a camera linear movement from a camera zero position on a measurement system reference frame with respect to a learned object, which is fixed in space and in a field of view of the camera. The aforementioned camera measurements are taken after or during each linear machine movement. The method further includes determining an angular offset of a machine tool xy plane with respect to a camera xy plane based on machine vectors defined by the at least two linear machine movements from the machine tool zero position and camera vectors defined by the at least two linear camera movements from the camera zero position. The method further includes rotationally transforming the initial coordinated movement machine reference frame to provide a rotationally transformed coordinated movement machine reference frame based on the determined angular offset of the machine tool xy plane with respect to the camera xy plane. The method further includes rotating the machine tool around at least two non-collinear z axes, which are each normal to the rotationally transformed coordinated movement machine reference frame. The method further includes measuring camera movements with respect to the learned object after or during each rotation of the machine tool around the at least two z axes. The method further includes determining an x offset and a y offset between a machine tool origin of the rotationally transformed coordinated movement machine reference frame and a camera origin. The x offset and the y offset are based on a linear offset between the at least two z axes and the measured camera movements with respect to the learned object after or during each rotation around the at least two z axes. The method further includes translationally transforming the rotationally coordinated movement machine reference frame to provide a translationally transformed coordinated movement machine reference frame based on the determined x offset and a y offset. The method further includes rotating the machine tool around at least two x axes or at least two y axes of the translationally transformed coordinated movement machine reference frame. The method further includes measuring camera movement with respect to the learned object after or during each rotation of the machine tool around the at least two x axes or around the at least two y axes. The method further includes determining a z offset between a machine tool origin of the translationally transformed coordinated movement machine reference frame and the camera origin based on a linear offset between the at least two x axes or y axes and the measured camera movements with respect to the learned object after or during each rotation of the machine tool around the at least two x axes or y axes. The method further includes translationally transforming the translationally coordinated movement machine reference frame based on the determined z offset.

DETAILED DESCRIPTION

Figure 1:
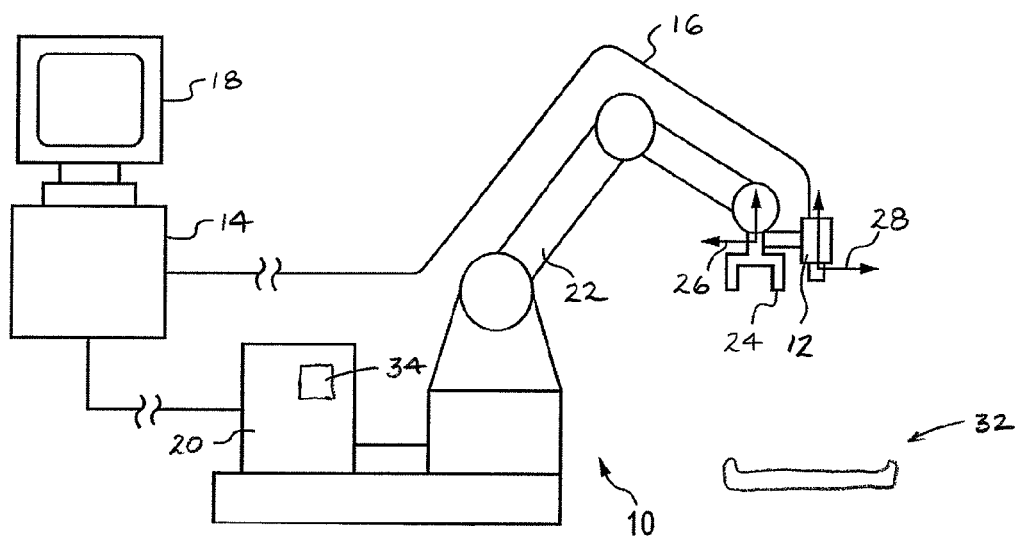
FIG. 1 is a schematic depiction of a coordinated movement machine, such as a robot, and a measurement system including a camera connected with the robot.

FIG. 1 depicts an example of a coordinated movement machine, which is robot 10, and an example of a measurement system that is capable of measuring six degrees of freedom without prior calibration. The measurement system depicted in FIG. 1 includes a camera 12 in communication with an image processing unit 14 via a communication link 16, which can be a wired or wireless connection. A display 18 can also be provided and in communication with the image processing unit 14 so as to display images captured by the camera 12. The camera 12 can be a conventional CCD camera.

The robot 10 includes a robot controller 20, a robot arm 22 and an end-effector 24, e.g., a welder, a grasper, a paint gun or other similar tool. The robot controller 20 controls the movement of the robot 10 including the robot arm 22 and the end effector 24. The robot arm 22 is moveable in multiple (x, y and z) directions and in multiple (x, y and z) axes providing six degrees of freedom. The end effector 24 mounts to the distal end portion of the robot arm 22. The camera 12 mounts adjacent a distal end portion of the robot arm 22 so that when the end effector 24 moves the camera 12 also moves.

A coordinated movement machine tool reference frame is a coordinate system for a tool on the coordinated movement machine. It is the tool on the coordinated movement machine that performs the work. For example, for the robot 10 depicted in FIG. 1, a robot tool reference frame 26, which is a coordinate system at the distal end portion of the robot arm 22 where the end-effector 24 is attached, is akin to the aforementioned coordinated movement machine tool reference frame. A camera reference frame 28 is a coordinate system for the camera 12, which is offset from the robot tool reference frame 26. The camera 12 and the image processing unit 14 operate as a measurement system whereby movement of the camera 12 can be measured with respect to an object 32 that is fixed in space and in the field of view of the camera 12 when the camera is moving. The camera 12 moves along with the end effector 24 so that the camera reference frame 28, which can also be referred to as a measurement system reference frame, moves along with the robot tool reference frame 26.

A processor 34, which can be located in the image processing unit 14, the robot controller 20 (as depicted) or elsewhere, is programmed to transform the camera reference frame 28 to the robot tool reference frame 26. In other words, through mathematical manipulation, the robot tool reference frame 26 can coincide with the camera reference frame 28. By transforming the camera reference frame 28 to the robot tool reference frame 26, when the location in space (x, y, z, Rx, Ry and Rz) of the camera 12 is known, then the location in space (x, y, z, Rx, Ry and Rz) of the end effector 24, which carries the robot tool, is known. An advantage over other robot guidance systems is that the transformation of the camera reference frame 28 to the robot tool reference frame 26 can occur without prior calibration with an external system.

As mentioned above, the camera 12 and the image processing unit 14 operate as a measurement device, and movement of the camera 12 can be measured with respect to an object 32 that is fixed in space. The robot 10 and the camera 12 illustrated in FIG. 1 do not need to be calibrated prior to use. There is no need to relate the camera reference frame 28 with the robot tool reference frame 26 prior to set up or use due to later-described visual guidance and recognition software. Moreover, there is no need to know the offset of the camera reference frame 28 with respect to the robot tool reference frame 26. The ability to proceed without calibration significantly reduces the set up time required for the robot 10 and reduces the amount of skill required by an operator of the robot 10. By eliminating the need to know the offset between the camera reference frame 28 and the robot tool reference frame 26, the camera 12 can be mounted in significantly more locations with respect to the end effector 24, so long as the camera 12 moves along with the end effector 24 and the learned object is maintained within the field of view of the camera 12 during this movement.

More specifically, movement of the camera 12 can be measured with respect to a "learned" object 32 that is fixed in space. The learning by the image processing unit 14 of the object 32 can be performed using the system and method disclosed in U.S. Pat. No. 8,150,165 to Melikian, filed on Apr. 11, 2008 and entitled SYSTEM AND METHOD FOR VISUAL RECOGNITION. According to the aforementioned system and method, an image of an object, such as the object 32, is learned or recognized by extracting unique points that are invariant to object presentations. The unique points are obtained by cross-correlating the image with a structure. Generally, the structure and/or the size of the structure may vary to detect extremum information associated with the object. An icon corresponding to each of the unique points is extracted. The size of the icon corresponds to the scale of the unique point. After extraction of the various icons, an object becomes a collection of icons. Each of these icons is un-rotated and normalized or resized to a constant size so it can be compared with other icons. One of the unique properties of these icons is their stability over scale and angle.

A method for aligning a coordinated movement machine tool reference frame with a measurement system reference frame will be described with reference to the robot 10, camera 12 and image processing unit 14 depicted in FIG. 1. FIG. 1 depicts only an example of a coordinated movement machine, i.e., the robot 10; however, the method for aligning a coordinated movement machine tool reference frame with a measurement system reference frame can be utilized with other coordinated movement machines such as CNC milling machines and the like. Moreover, the method for aligning a coordinated movement machine tool reference frame with a measurement system reference frame is amenable to use with other measuring systems that need no prior calibration. The method for aligning the robot tool reference frame 26 with the camera reference frame 28 will be described as an arrangement of steps. Although the steps may be described in a particular order, the order in which the steps are performed need not be in the same order as those described or shown in FIG. 2. The steps will be described in a logical order; however, the order in which the steps are described should in no way limit the order of the steps to any particular order.

Figure 2:
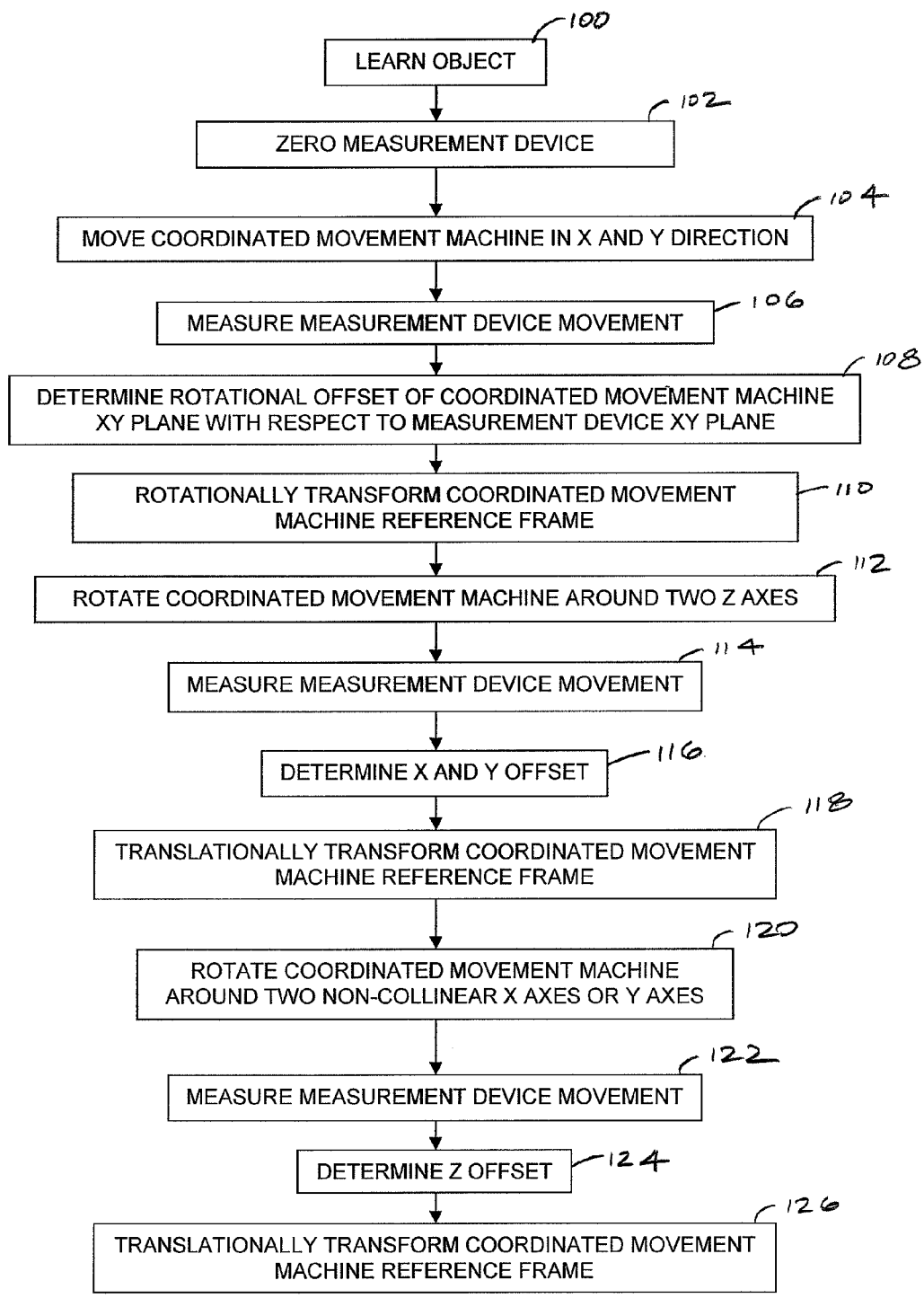
FIG. 2 is a flow diagram depicting a method for aligning a coordinated movement machine tool reference frame with a measurement system reference frame.

The method for aligning the robot tool reference frame 26 with the camera reference frame 28 can begin, at step 100 in FIG. 2, with learning the object 32 that is fixed in space. This process of learning the object 32 has been described above. Different than other robot camera calibration methods, there is no need for a two-dimensional checkerboard to align the camera reference frame 28 with respect to the robot tool reference frame 26. Instead, any sort of object, e.g., a part of an automobile such as a door or a fender, can be "learned" to align the robot tool reference frame 26 with the camera reference frame 28.

With reference to step 102 in FIG. 2, the camera position can be set to zero, which is an arbitrary point in space occupied by the camera at which all coordinates (x, y, z, Rx, Ry and Rz) measure zero. For the sake of clarity, this camera position in which all coordinates measure zero will be referred to as the camera zero position, which will also be referred to as "CP0." It is not absolutely necessary that all coordinates of the camera 12 measure zero at the camera zero position, so long as the coordinates are known, but having all coordinates equal zero does simplify the calculations. The location of the end effector 24 with the camera 12 at CP0 can be referred to as the machine tool zero position or the robot zero position, which will also be referred to as RP0. It may be desirable to zero all coordinates (x, y, z, Rx, Ry and Rz) for the center (or other desired point) of the end effector 24 when the camera 12 is at CP0 to simplify the calculations. The machine tool zero position RP0 can be set as the origin of an initial coordinated movement machine reference frame. Similar to the camera zero position, however, it is not absolutely necessary that all coordinates of the center (or other desired point) of the end effector 24 measure zero at the robot zero position, so long as the coordinates are known.

The rotational offset of the robot tool reference frame 26 with respect to the camera reference frame 28 can then be determined. With reference to step 104 in FIG. 2, two non-collinear pure translational (i.e., no rotational) movements of the end effector 24 from the robot zero position are applied to the robot, and at step 106 the movement of the camera 12 is measured. For example, the robot arm 22 is directed to move the center of the end effector 24 from RP0 to point RP1, which is a known number of units (e.g., centimeters or inches) in the x-direction from RP0. Since the end effector 24 has been moved, the camera 12, which is connected to the robot arm 22, is also moved from the camera zero position (CP0) to a new point, hereinafter CP1, in space. The movement of the camera 12 from CP0 to CP1 (where the center of the robot end effector is at point RP1) can be measured in the image processing unit 14 based on comparing the image of the learned object 32 taken when the camera was at CP0 to the image of the learned object 32 when the camera is at CP1. By locating unique points in each image, which has been described above, and based on the pixel size in each image, the array size of a CCD sensor (not shown) for the camera 12, and the focal length of the lens (not shown) for the camera 12 the distance between CP0 and CP1 can be measured. After movement in the x-direction, the robot arm 22 can be directed to move the center of the end effector 24 from RP0 to point RP2, which is a predetermined number of units (e.g., centimeters or inches) from RP0 in the y-direction. This second movement of the end effector 24 need not be perpendicular, i.e., it could have an x-component and a y-component, however, the second movement is not to be collinear with the first movement so that a plane is defined between a first vector from RP0 to RP1 and a second vector from RP0 to RP2. The movement of the camera 12 from CP0 to its new location CP2 (where the center of the robot end effector is at point RP2) can also be measured in the image processing unit 14 in the manner described above.

At step 108 the angular offset of a robot xy plane with respect to a camera xy plane is determined, which allows for a rotational transformation of the robot tool reference frame 26 with respect to the camera reference frame 28. The first robot vector, RP0→RP1, and the second robot vector, RP0→RP2, define a robot xy plane with an origin at the robot zero position, i.e., RP0. The first camera vector, CP0→CP1, and the second camera vector, CP0→CP2, define a camera xy plane with an origin at the camera zero position, i.e., CP0. The angular offset of the robot xy plane with respect to the camera xy plane correlates to the rotational offset of the initial coordinated movement machine reference frame with respect to the camera reference frame 28. At step 110, the initial coordinated movement machine reference frame is rotationally transformed to provide a new reference frame, hereafter a rotationally transformed coordinated movement machine reference frame, by the angular offset of the robot xy plane with respect to the camera xy plane so that the robot xy plane is parallel with the camera xy plane.

The magnitude of the first robot vector, RP0→RP1, is known based on the instruction given above through the robot controller 20 to move the center (or other desired point) of the end effector 24 from RP0 to RP1. Likewise, the magnitude of the second robot vector, RP0→RP2, is known based on the instruction given above through the robot controller 20 to move the center (or other desired point) of the end effector 24 from RP0 to RP2. Once the rotational transformation between the robot xy plane with respect to the camera xy plane has occurred, the magnitude of the first robot vector, RP0→RP1, should be equal to the magnitude of the first camera vector, CP0→CP1, and the magnitude of the second robot vector, RP0→RP2, should be equal to the magnitude of the second camera vector, CP0→CP2. In other words, if the robot arm 22 was instructed to move 10 centimeters in the positive x-direction for the first movement, RP0→RP1, then the camera 12 and image processing unit 14, should measure movement 10 centimeters in the positive x-direction once the rotational transformation between the robot xy plane with respect to the camera xy plane has occurred.

If the camera measurements are affected by a non-trivial error, this alignment may not be very accurate. If the measurement error is proportional (linear or not) to the magnitude of the measured displacement, then steps 102 through 110 can be repeated, however, the previous rotationally transformed coordinated movement machine reference frame is replaced each iteration with a new rotationally transformed coordinated movement machine reference frame. The steps 102 through 110 can be repeated each time beginning with the new rotationally transformed coordinated movement machine reference frame until the wanted accuracy in the xy plane parallelism is reached or when the camera measurement error becomes bigger than the xy parallelism error.

Starting from rotationally transformed coordinated movement machine reference frame, which may have undergone a number of iterations, next is to determine an offset for each of the x and y components of a machine tool origin of the rotationally transformed coordinated movement machine reference frame and a camera origin, which can coincide with the camera zero position (CP0). The difference in the x component between the machine tool origin and CP0 is referred to below as Offset_x and the difference in the y component between the machine tool origin and CP0 is referred to below as Offset_y. Determining these offsets is accomplished by rotating the end effector 24 around two different z axes, at step 112, and measuring camera movement, at step 114, during or after each rotation.

At step 112, the robot arm 22 can be controlled so that the end effector 24 is rotated around a first z axis, which is normal to the an xy plane of the rotationally transformed coordinated movement machine reference frame. For example, the center of the end effector 24 can reside on the first z axis, and as the end effector 24 rotates in the first z axis, the camera 12 orbits around the first z axis. The robot arm 22 can be directed to rotate the end effector 24 a known first angular displacement, Rz1, with the center of the end effector 24 being on the first z axis. Since the camera 12 is spaced from the center of the end effector 24, as the end effector 24 rotates around the first z axis, the camera 12 is moved from a starting location, i.e., the location prior to the rotation, to an ending location, i.e., the location after the rotation. C$\Delta$x1 and C$\Delta$y1 are the measurement from the camera starting location to the camera ending location after rotating around the z axis. The end effector 24 is then instructed to rotate around a second z axis, parallel to the first z axis, offset by a known non-zero quantity. The displacement between the first z axis and the second z axis in the x direction is referred to below as Displacement_x and the displacement between the first z axis and the second z axis in the y direction is referred to below as Displacement_y. The robot arm 22 is rotated around the second z axis by the same amount Rz1 done at the previous step. As the end effector 24 rotates around the second z axis, the camera 12 is moved from a starting location on the camera xy plane, i.e., the location prior to the rotation, to an ending location on the camera xy plane, i.e., the location after the rotation. The change in the x component between the second camera starting location and the second camera ending location can be expressed as C$\Delta$x2 and the change in the y component between the second camera starting location and the second camera ending location can be expressed as C$\Delta$y2.

The two rotations of the end effector 24 define the following equations, which at step 116 can be used to determine the x and y offset between the machine tool origin of the rotationally transformed coordinated movement machine reference frame and the camera origin, which can coincide with CP0:

$$\frac{\text{Offset\_x}}{C\Delta y1} = \frac{(\text{Offset\_x} + \text{Displacement\_x})}{C\Delta y2}$$

and $$\frac{\text{Offset\_y}}{C\Delta x1} = \frac{(\text{Offset\_y} + \text{Displacement\_y})}{C\Delta x2}$$

Offset_x, which is the difference in the x component between the machine tool origin of the rotationally transformed coordinated movement machine reference frame and CP0, and Offset_y, which is the difference in the y component between the aforementioned machine tool origin and CP0, can be determined because the remaining parameters in the above two formulas are known. Displacement_x and Displacement_y are known based on the instructions given to the robot arm 22 through the robot controller 20 when moving from the first z axis to the second z axis. The camera movements, i.e., C$\Delta$x1, C$\Delta$x2, C$\Delta$y1, and C$\Delta$y2, are measured in the same manner that the magnitude of the first camera vector, CP0→CP1, and the second camera vector, CP0→CP2, were measured. If the camera measurements are not affected by error, then an exact transformation of the x and y components of the CP0 with respect to the machine tool origin will result upon solving for Offset_x and Offset_y. At step 118, the rotationally transformed coordinated movement machine reference frame is then transformed by offsetting its center, i.e., the machine too origin, by Offset_x and Offset_y, and hereinafter will be referred to as a translationally transformed coordinated movement machine reference frame.

If the camera measurements are affected by a non-trivial error, this alignment may not be very accurate. If the measurement error is proportional (linear or not) to the magnitude of the measured displacement, then steps 112 through 116 can be repeated, however, the previous translationally transformed coordinated movement machine reference frame is replaced with a new translationally transformed coordinated movement machine reference frame. The steps 112 through 116 can be repeated each time beginning with the new translationally transformed coordinated movement machine reference frame until the wanted accuracy in the xy translationally transformed coordinated movement machine reference frame center is reached or when the camera measurement error becomes bigger than the xy robot translationally transformed coordinated movement machine reference frame center error.

Next is to determine a z offset between a machine tool origin of the translationally transformed coordinated movement machine reference frame and the camera origin, also referred to as the camera zero position (CP0). The difference in the z component between the machine tool origin of the translationally transformed coordinated movement machine reference frame and CP0 is referred to below as Offset_z. Determining the z offset is accomplished by rotating the end effector 24 around two different x axes or two different y axes, at step 120, and measuring camera movement, at step 122, during each rotation. The x axes and the y axes are each perpendicular to the z axes. With the exception of rotating the end effector 24 around different axes, determining Offset_z can be performed in the same manner as determining Offset_x and Offset_y.

At step 124, when rotation of the end effector 24 occurs around two x axes, the determination of the z offset between the machine tool origin of the translationally transformed coordinated movement machine reference frame and the camera zero position (CP0) can be calculated based on the following formula:

$$\frac{\text{Offset\_z}}{C\Delta y1} = \frac{(\text{Offset\_z} + \text{Displacement\_z})}{C\Delta y2}$$

Similar to above, C$\Delta$y1 refers to the change in the y component between the camera starting location prior to the rotation of the end effector 24 and the camera ending location after the rotation of the end effector 24 around the first x axis. C$\Delta$y2 refers to the change in the y component between the camera starting location prior to the rotation of the end effector 24 and the camera ending location after the rotation of the end effector 24 around the second x axis. Displacement_z is the distance between the first x axis and the second x axis in the z direction.

At step 124, when rotation of the end effector 24 occurs around two y axes, the determination of the z offset between the machine tool origin of the translationally transformed coordinated movement machine reference frame and the camera zero position (CP0) can be calculated based on the following formula:

$$\frac{\text{Offset\_z}}{C\Delta x1} = \frac{(\text{Offset\_z} + \text{Displacement\_z})}{C\Delta x2}$$

Similar to above, C$\Delta$x1 refers to the change in the x component between the camera starting location prior to the rotation of the end effector 24 and the camera ending location after the rotation of the end effector 24 around the first y axis. C$\Delta$x2 refers to the change in the y component between the camera starting location and the camera ending location for rotation around the second y axis. Displacement_z is the distance between the first y axis and the second y axis in the z direction.

At step 126, the translationally transformed coordinated movement machine reference frame is then transformed by offsetting its center, i.e., the machine tool origin, by Offset_z, and hereinafter will be referred to as a z axis translationally transformed coordinated movement machine reference frame.

If the camera measurements are affected by a non-trivial error, this alignment may not be very accurate. If the measurement error is proportional (linear or not) to the magnitude of the measured displacement, then steps 120 through 124 can be repeated, however, the previous z axis translationally transformed coordinated movement machine reference frame is replaced with a new z axis translationally transformed coordinated movement machine reference frame. The steps 120 through 124 can be repeated each time beginning with the new z axis translationally transformed coordinated movement machine reference frame until the wanted accuracy in the z axis translationally transformed coordinated movement machine reference frame center is reached or when the camera measurement error becomes bigger than the z axis translationally transformed coordinated movement machine reference frame center error.

By rotationally aligning the robot tool reference frame 26 with the camera reference frame 28 when the location of the camera 12 is known in space, the location of the end effector 24 (as the robot tool thereon) is also known.

The method for aligning a coordinated movement machine tool reference frame with a measurement system reference frame was described with reference to the robot 10, camera 12, image processing unit 14, robot tool reference frame 26 and camera reference frame 28 depicted in FIG. 1. Where a camera similar to the camera 12 is mounted adjacent a machine tool, e.g. a milling tool, on a coordinated movement machine, e.g., a CNC milling machine, the above described method could also be used to align the machine tool reference frame with the camera reference frame.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims

The invention claimed is:

1. A method for aligning a coordinated movement machine tool reference frame with a measurement system reference frame, the method comprising:
applying at least two linear machine movements to a machine tool on a coordinated movement machine, wherein each linear machine movement is from a machine tool zero position on an initial coordinated movement machine reference frame and the at least two linear machine movements are not collinear;
measuring at least two linear camera movements of a camera mounted on the coordinated movement machine for movement with the machine tool using a camera and a processor in communication with the camera, each camera linear movement is from a camera zero position on a measurement system reference frame with respect to a learned object, which is fixed in space and in a field of view of the camera, after or during each linear machine movement;
determining an angular offset of a machine tool xy plane with respect to a camera xy plane based on machine vectors defined by the at least two linear machine movements from the machine tool zero position and camera vectors defined by the at least two linear camera movements from the camera zero position;
rotationally transforming the initial coordinated movement machine reference frame to provide a rotationally transformed coordinated movement machine reference frame based on the determined angular offset of the machine tool xy plane with respect to the camera xy plane;
rotating the machine tool around at least two non-collinear z axes, which are each normal to an xy plane of the rotationally transformed coordinated movement machine reference frame;
measuring camera movements with respect to the learned object after or during each rotation of the machine tool around the at least two non-collinear z axes;
determining an x offset and a y offset between a machine tool origin of the rotationally transformed coordinated movement machine reference frame and a camera origin based on a linear offset between the at least two non-collinear z axes and the measured camera movements with respect to the learned object after or during each rotation around the at least two non-collinear z axes;

translationally transforming the rotationally coordinated movement machine reference frame to provide a translationally transformed coordinated movement machine reference frame based on the determined x offset and y offset;
rotating the machine tool around at least two non-collinear x axes or at least two non-collinear y axes of the translationally transformed coordinated movement machine reference frame;
measuring camera movement with respect to the learned object after or during each rotation of the machine tool around the at least two non-collinear x axes or around the at least two non-collinear y axes;
determining a z offset between a machine tool origin of the translationally transformed coordinated movement machine reference frame and the camera origin based on a linear offset between the at least two non-collinear x axes or y axes and the measured camera movements with respect to the learned object after or during each rotation of the machine tool around the at least two non-collinear x axes or y axes; and
translationally transforming the translationally transformed coordinated movement machine reference frame based on the determined z offset.

2. The method of claim 1, wherein the machine tool is an end effector on a robot arm.

3. The method of claim 1, wherein the camera zero position is a point in space occupied by the camera in which all coordinates (x, y, z, Rx, Ry and Rz) measure zero.

4. The method of claim 3, wherein the machine tool zero position is a point in space occupied by the machine tool when the camera is at the camera zero position.

5. The method of claim 1, wherein the at least two linear machine movements includes a first linear movement and a second linear movement, which is perpendicular to the first linear movement.

6. The method of claim 1, further comprising comparing the machine vectors to the camera vectors after determining the angular offset of the machine tool xy plane with respect to the camera xy plane.

7. The method of claim 6, where there is an unacceptable error between the machine vectors and the camera vectors the method further comprising:
repeating the applying at least two linear machine movements step, the measuring at least two linear camera movements step and the determining an angular offset step until a desired accuracy in parallelism between the machine tool xy plane and the camera xy plane is achieved.

8. The method of claim 1, further comprising comparing an origin of the rotationally coordinated movement machine reference frame to the camera origin after translationally transforming the rotationally coordinated movement machine reference frame.

9. The method of claim 8, where there is an unacceptable error between the origin of the rotationally coordinated movement machine reference frame and the camera origin the method further comprising:
repeating the rotating the machine tool around at least two non-collinear z axes, repeating measuring camera movements with respect to the learned object after of during each rotation of the machine tool around the at least two non-collinear z axes, and determining the x offset and a y offset between the machine tool origin of the rotationally transformed coordinated movement machine reference frame and the camera origin until a desired accuracy is achieved.

\* \* \* \* \*